United States Patent
Lodeweyckx

(10) Patent No.: US 8,892,165 B2
(45) Date of Patent: Nov. 18, 2014

(54) DEVICE AND A METHOD FOR ENHANCING USER EXPERIENCE IN MOBILE COMMUNICATIONS

(75) Inventor: Stefan Lodeweyckx, Leuven (BE)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 112 days.

(21) Appl. No.: 13/176,235

(22) Filed: Jul. 5, 2011

(65) Prior Publication Data

US 2012/0322505 A1 Dec. 20, 2012

(30) Foreign Application Priority Data

Jun. 17, 2011 (GB) .................................. 1110236.5

(51) Int. Cl.
| | | |
|---|---|---|
| *H04B 1/38* | (2006.01) | |
| *H04W 8/26* | (2009.01) | |
| *H04W 12/06* | (2009.01) | |
| *H04W 8/18* | (2009.01) | |
| *H04W 48/18* | (2009.01) | |

(52) U.S. Cl.
CPC .............. *H04W 8/265* (2013.01); *H04W 12/06* (2013.01); *H04W 8/183* (2013.01); *H04W 48/18* (2013.01)
USPC ......... 455/558; 455/404.2; 455/411; 455/436; 455/456.1; 455/420; 370/328; 370/329; 370/331

(58) Field of Classification Search
CPC ..... H04W 12/06; H04W 48/18; H04W 8/183; H04W 8/265
USPC ................. 455/404.1, 412.1–414.2, 419–420, 455/456.1–457, 550.2, 556.2, 558; 379/357.01, 433.09, 357.02, 211.05
See application file for complete search history.

(56) References Cited

U.S. PATENT DOCUMENTS

2004/0203712 A1* 10/2004 Murai et al. ............... 455/422.1
2009/0061828 A1* 3/2009 Sigmund et al. ............. 455/413

(Continued)

FOREIGN PATENT DOCUMENTS

GB 2492750 A 1/2013
WO WO 2010/095020 A1 8/2010

OTHER PUBLICATIONS

"3rd Generation Partnership Project; Technical Specification Group Services and System Aspects" 3G TS 33.120, vol. 3.0.0, May 1999, pp. 1-10.
U.S. Appl. No. 13/540,043, filed Jul. 2, 2012, Lodeweyckx.

*Primary Examiner* — Babar Sarwar
(74) *Attorney, Agent, or Firm* — Oblon, Spivak, McClelland, Maier & Neustadt, L.L.P.

(57) ABSTRACT

A method of operating a mobile data processing apparatus comprises executing one or more programs which make use of mobile data access; a wireless interface communicating with a mobile data network, the wireless interface and the mobile data network cooperating to provide wireless data services to the one or more programs; in respect of a first predetermined set of data services, providing data to the wireless interface from a non-removable, identification module so as to identify the mobile data processing apparatus to the mobile data network according to a first mobile identity; and in respect of other data services, providing data to the wireless interface from a user-removable, identification module so as to identify the mobile data processing apparatus to the mobile data network according to a separate mobile identity, different to the first mobile identity.

29 Claims, 12 Drawing Sheets

(56) References Cited

U.S. PATENT DOCUMENTS

| | | |
|---|---|---|
| 2009/0313497 A1* | 12/2009 | Lumbroso et al. ............... 714/3 |
| 2011/0269503 A1* | 11/2011 | Park et al. ................. 455/552.1 |
| 2012/0029303 A1* | 2/2012 | Shaya ........................... 600/300 |
| 2012/0094718 A1* | 4/2012 | Kim .............................. 455/559 |
| 2012/0214439 A1* | 8/2012 | Yuan et al. .................... 455/405 |
| 2013/0072178 A1* | 3/2013 | Shaw ........................... 455/418 |

* cited by examiner

| APPLICATION | SIM | DEFER |
|---|---|---|
| Browser | Open SIM | |
| Diagnostics | Embedded SIM | NO |
| ⋮ | ⋮ | |
| Marketing | Embedded SIM | YES |
| ⋮ | ⋮ | |
| Default | Open SIM | |

DEVICE AND A METHOD FOR ENHANCING USER EXPERIENCE IN MOBILE COMMUNICATIONS

RELATED DOCUMENT

This application claims priority from United Kingdom patent application number GB1110236.5 filed on 17 Jun. 2011, the contents of which are hereby incorporated by reference in their entirety.

BACKGROUND

1. Field of the Invention

This invention relates to mobile communications.

2. Description of the Prior Art

Many mobile communications devices make use of so-called SIMs.

A SIM (subscriber identification module) is typically a secure data storage device, often embodied as a small form factor flat card which is insertable into a mobile communications device. The SIM carries certain data which uniquely identifies the user or owner of that SIM. Some of this data is transmitted across the mobile network to identify the user equipment (UE) into which the SIM is inserted, and some is kept secret within the SIM (and within a secure database held by the mobile network operator or "MNO") for use in generating encryption keys for secure data transmission across the network.

In many countries there is a requirement that the SIM fits into a socket in the UE which is accessible by the user. This is to allow the user to choose a difference card if he/she desires. In turn, this allows the user to select a different mobile network operator or a different network tariff. The ability for the user to do this is required by the competition law of many countries.

Having said this, some devices such as the Amazon® Kindle® electronic book reading device contain a SIM which is inaccessible to the user. In other words, the user cannot choose a different network operator for mobile data access using this book reading device. However, this arrangement is perceived to be acceptable because the user is not charged for mobile data access relating to the provision of electronic books and the device does not provide open internet access, so there is neither a requirement under competition law nor a direct benefit the user in allowing a user-instigated change to another mobile network operator.

It is known to include two SIM sockets within a single device. Some mobile telephones provide this function, which allows a user to travel between two different countries and make use of a SIM relevant to each country, thereby avoiding so-called roaming charges. Both SIM sockets allow the user removal or insertion of SIMs as discussed above.

WO 2010/095020 A1 discloses a mobile telephone having a substitute emergency SIM for use in making emergency calls in case the user-installed SIM is invalid or otherwise unavailable.

It is an object of the invention to provide an improved user experience involving a device making use of a SIM or similar identification module.

SUMMARY OF THE INVENTION

This invention provides a method of operating a mobile data processing apparatus, comprising:

executing one or more programs which make use of mobile data access;

a wireless interface communicating with a mobile data network, the wireless interface and the mobile data network cooperating to provide wireless data services to the one or more programs;

in respect of a first set of data services, providing data to the wireless interface by identifying the mobile data processing apparatus to the mobile data network according to a first mobile identity; and in respect of other data services not part of the first set of services, providing data to the wireless interface so as to identify the mobile data processing apparatus to the mobile data network according to a separate mobile identity, different to the first mobile identity.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
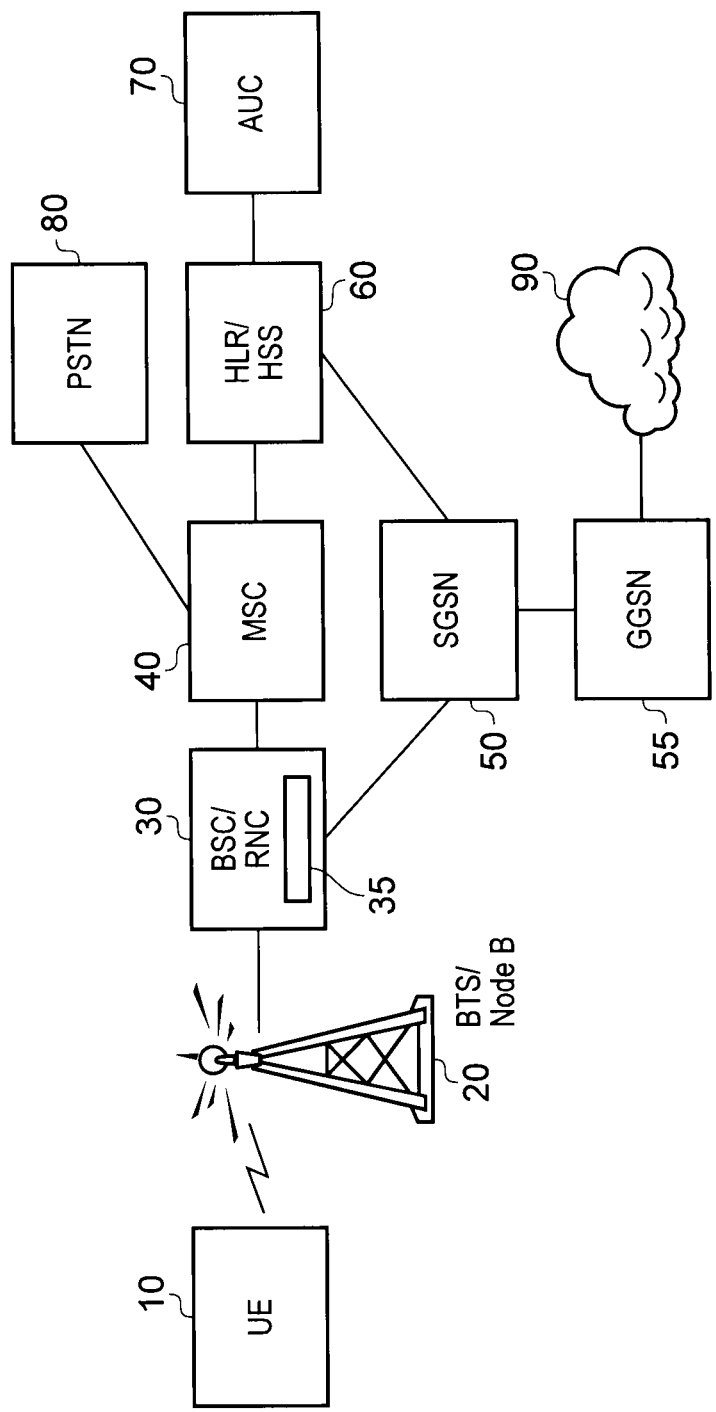
FIG. 1 is a schematic diagram of a mobile communications network.

Referring now to FIG. 1, a mobile communications network comprises a user equipment (UE) 10, a base transceiver station (BTS) 20 (the equivalent function being referred to as "NodeB" in the context of a UMTS (Universal Mobile Telecommunications System) 3G (third generation) network, but only the acronym BTS will be used in this description), a base station controller/radio network controller (BSC/RNC) 30, a mobile switching centre (MSC) 40, a serving GPRS (general packet radio service) support node (SGSN) 50, a Gateway GPRS Support Node (GGSN) 55, a home location register (HLR) 60 and an authentication centre (AUC) 70. The MSC 40 connects to a public switched telephone network (PSTN) 80. The SGSN 50 connects to the Internet 90 via the GGSN 55.

In operation, the UE 10 connects via a wireless link to the BTS 20 which in turn is connected (usually by a wired or other point to point link) to the BSC/RNC 30. The BTS contains equipment for transmitting and receiving radio signals, antennas, and equipment for encrypting and decrypting communications with the BSC/RNC 30.

The BSC/RNC 30 controls the operation of the BTSs 20. Typically a BSC/RNC has many BTSs under its control. The BSC/RNC allocates radio channels and controls the handover of communication with a particular UE between different BTSs. The BSC/RNC 30 also multiplexes the many different low data rate communications with individual UEs into a higher data rate connection with the MSC 40.

The BSC/RNC 30 may have an associated packet control unit (PCU) 35 which carries out some of the functions of the BSC/RNC 30, but for packet data. The BSC/RNC, BTSs and PCU are sometimes collectively referred to as the BSS (base station subsystem) or, in 3G networks, the RAN (radio access network).

The MSC 40 is primarily responsible for routing voice calls, SMS (short messaging service, otherwise known as "text") messages and circuit switched data. In respect of voice calls, the MSC 40 is able to route a call from a mobile UE to a fixed (landline) telephone using the PSTN 80. In general terms, the MSC is responsible for setting up and releasing the end-to-end connection, supervising hand-over between BSC/RNCs during a call and coordinating charging and account monitoring.

The HLR 60 (the generally equivalent function within 3G networks, as of LTE or "Long Term Evolution", being known as the Home Subscriber Server or HSS) is a central database that contains details of each mobile phone subscriber that is authorised to use the core network. There can be several HLR/HSSs in existence, though each individual mobile subscriber identity can be associated only with one logical HLR/HSS (although this can span several physical nodes) at a time.

The HLR/HSSs store details of every SIM issued by a mobile phone operator. Each SIM has a unique identifier called an IMSI which is the primary key to each HLR/HSS record. The HLR/HSS also stores MSISDNs (Mobile Subscriber Integrated Services Digital Network Numbers) which represent the telephone numbers associated with the SIMs. A SIM has a primary MSISDN which is the number used for making and receiving voice calls and SMS messages, but it is possible for a SIM to have other secondary MSISDNs, for example being associated with fax or circuit switched data calls. An IMSI is also associated with details of services applicable to that user and call divert settings associated with an MSISDN. Note that in general, a SIM need not necessarily have an associated MSISDN if the SIM is used in the context of data access only.

The HLR/HSS 60 also connects to the AUC 70 whose function is to authenticate each SIM that attempts to connect to the network. This authentication process will be described in detail below. In brief, however, when the authentication process takes place (typically when a UE is first switched on), the UE sends its IMSI to the AUC via the HLR/HSS. The AUC replies with data derived from a so-called triplet of authentication data derived using a secure key known only to the AUC and to the SIM. This secure key is referred to as Ki. The SIM then sends a further reply to the AUC based on data from the triplet and, assuming the reply is in the correct form, the SIM (that is to say, that IMSI) is authorised for interaction with the network. The secure key Ki is securely stored on the SIM (which in the case of current SIMs takes place during manufacture), and is also securely replicated onto the AUC. These are the only copies of the secure key Ki. Ki is never transmitted between the AUC and the SIM, but instead is combined with the IMSI to produce a challenge and response for identification purposes and an encryption key called Kc for use in over-the-air communications.

The IMSI-Ki pair represents data defining a mobile identity, comprising an identification value (IMSI) which is transmitted to the mobile network as part of the network authorisation procedure, and a secure key (Ki) which is not transmitted to the mobile network as part of the network authorisation procedure, but from which the same card's network interface derives identification data and encryption/decryption key data for use in encryption and decryption of data communication over the mobile network.

Once authentication has taken place, the authorisation triplet data is buffered at the SGSN 50. As mentioned, the triplet includes the encryption key Kc for use in encrypting data transfers between the UE and the network. The encryption/decryption process using Kc takes place at the currently active BSS/RAN applicable to that UE.

The Gateway GPRS Support Node (GGSN) is a main component of the GPRS network and handles matters such as IP (internet Protocol) address assignment and the like. The GGSN controls interaction between the GPRS network and external packetised networks such as the Internet 90. The GGSN checks if a user (being a recipient of a data transfer) is active, and if so, forwards the data to the respective SGSN serving that user. If the mobile user is inactive, the data is discarded. When a user initiates a data transfer, the packetised data is routed to the correct external network by the GGSN.

Figure 2:
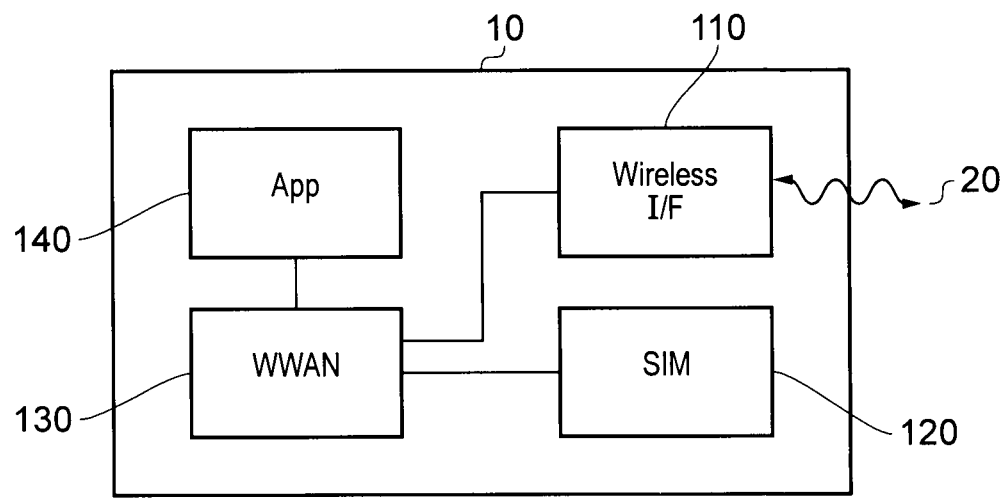
FIG. 2 is a schematic diagram of a user equipment (UE)

FIG. 2 is a schematic diagram of an example UE making use of data communications via the mobile network. The UE comprises a wireless interface 110 which provides the wireless communication with the BTS 20, a SIM 120, a wireless wide area network (WWAN) processor 130 and application software 140. It will be understood that the application software 140 communicates with a user interface such as a keyboard, a display, a touch screen and the like. For clarity, these items are not shown in FIG. 2.

The SIM acts as an identification module for securely providing a mobile identity to a mobile data network for use in identifying mobile equipment in which that identification module is installed.

Once the SIM of the UE 10 has been authorised, the operation involves the application software 140 initiating a message to be sent via the mobile network and passing that message to the WWAN processor 130 which formats it into a suitable form for transmission (for example as so-called IP data packets). Using a key Kc supplied by the SIM and an "A5" encryption algorithm, the WWAN processor 130 encrypts the data packets. The encryption key Kc used for encryption is the one that was established during the authorisation process. The encrypted data is then passed from the WWAN processor 130 to the wireless interface 110 for transmission to the BTS 20. With regard to messages received from the network, data is transmitted from the BTS 20 to the UE and is received by the wireless interface 110. The data is decrypted by the WWAN processor using a key Kc supplied by the SIM 120, and is formatted (for example, depacketised) to be passed to the application software 140.

Figure 3:
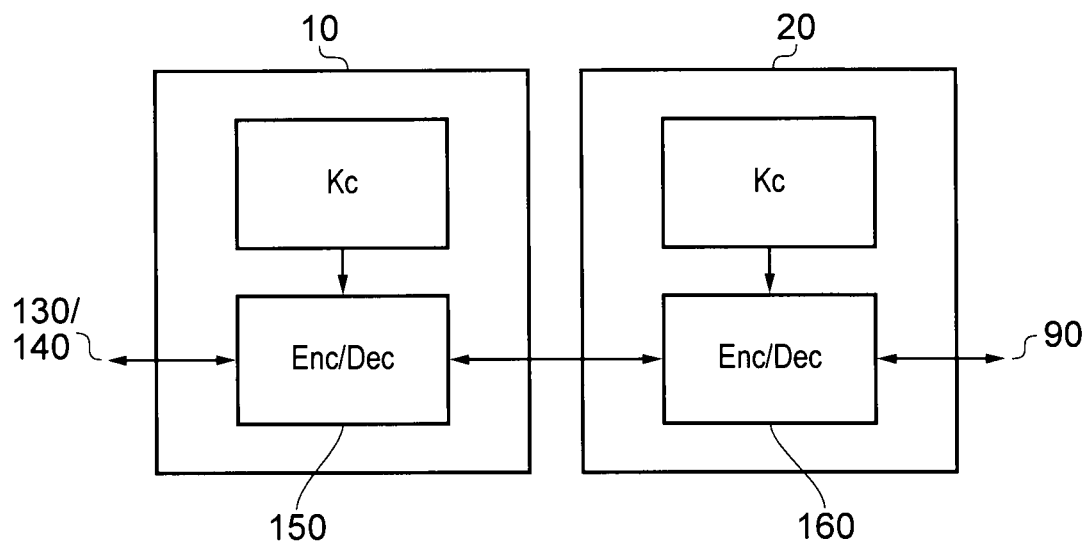
FIG. 3 is a schematic diagram of a data communication process via the network of FIG. 1.

FIG. 3 is a schematic diagram of a data communication process via the network of FIG. 1. Here, the encryption and decryption processes are illustrated in a schematic form. At the UE 10, data passing to and from the application software 140 (via the WWAN processor 130) is subject to an encryption/decryption process 150 under the control of the key Kc. The encrypted data is passed via the mobile network to the BTS 20 where it is decrypted using an encryption/decryption process 160, again with reference to the key Kc. The clear (no longer encrypted) data is then transferred to and from the Internet 90. Accordingly, the data path between the SIM 120 and the BTS 20 carries data which is encrypted using the key Kc, whether that data is being transmitted to the UE or from the UE. Data outside of that encrypted path is clear data.

Figure 4:
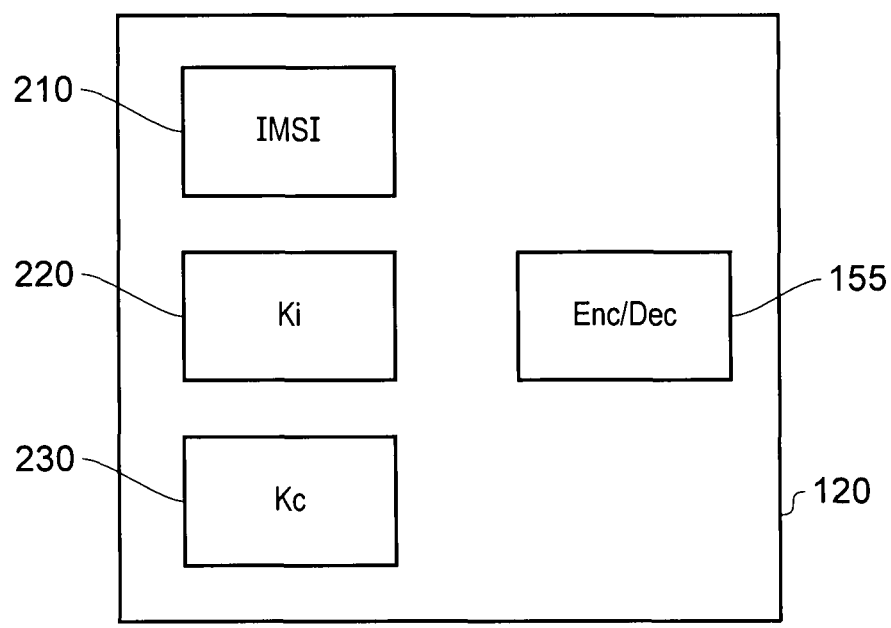
FIG. 4 schematically illustrates a SIM.

FIG. 4 schematically illustrates a SIM. The term "SIM" stands for "subscriber identification module", and this identification function is carried out by virtue of the SIM carrying a unique IMSI and associated respective unique secure key Ki associated with a subscriber. The significant features of the SIM shown in FIG. 4 are as follows: secure storage (or at least a mobile identity storage controller for accessing memory, which would normally be on the SIM, which securely stores data defining the IMSI) for the IMSI 210, secure storage 220 (or at least a storage controller as above) holding the secure key Ki, memory storage 230 which holds the encryption key Kc and other temporary data and an encryption/decryption function 155 which also acts as a network interface for generating data derived from a mobile identity for transmission to a mobile network during a network authorisation procedure, and for handling acknowledgement data received back from the mobile network indicating whether authorisation was successful based on that mobile identity. The encryption/decryption function 155 carries out various different functions at different stages in operation. At least three encryption algorithms are provided. In brief, the two of these directly relating to the SIM are referred to as the A3 algorithm and the A8 algorithm. The A5 algorithm is used by the WWAN processor 130 and will be described for comparison.

The A3 algorithm is a one-way function used to compute a signed response (SRES) during the authentication process. The generation and use of the SRES will be described further below. The A3 algorithm resides on the SIM and at the AUC.

The A5 algorithm is a two-way function used by the WWAN processor 130 to encrypt and decrypt data that is being transmitted over the wireless interface, that is to say, it is the function which encrypts and decrypts data using the encryption/decryption key Kc described with reference to FIG. 3.

The A8 algorithm is a one way function used to generate the 64-bit key Kc. The generation of the key Kc will be described further below. The A8 algorithm also resides on the SIM and at the AUC.

Figure 5:
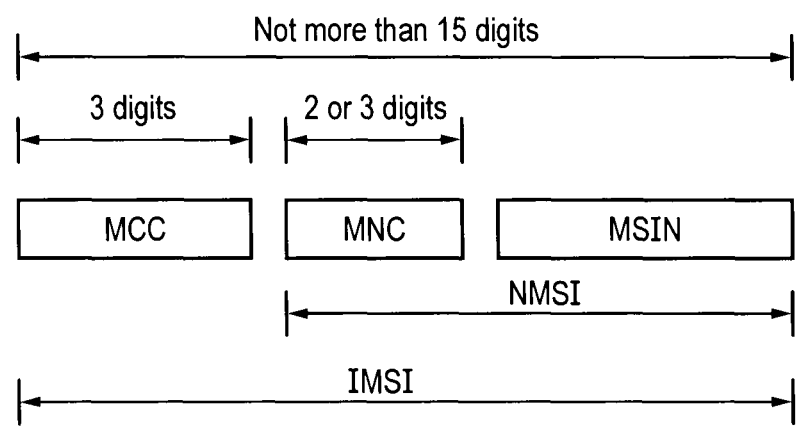
FIG. 5 schematically illustrates the structure of an IMSI (International Mobile Subscriber Identifier)

Note that in 3G networks, an enhanced authentication algorithm (AKA—Authentication and Key Agreement) is used, and other algorithms than the A5 algorithm may be used. Other techniques, such as using a 128 bit CK (Ciphering Key) rather than the 64 bit Kc, may apply. Differences between 3G and 2G (second generation) networks are widely published, for example in http://www.3gpp.org/ftp/tsg_sa/wg3_security/_specs/33120-300.pdf FIG. 5 schematically illustrates the format of an IMSI. The term "IMSI" stands for "international mobile subscriber identifier" and represents a unique identification associated with all users of the network. It is stored as a 64-bit field in secure storage 210 within the SIM and, when required, is sent by the UE to the network.

The maximum length of an IMSI is 15 decimal digits. The first three digits represent a mobile country code or MCC which identifies the country of origin of the subscriber's SIM. The next two or three digits represent a mobile network code or MNC which identifies a network company which provided (or possibly, which owns) the SIM. The final digits provide a mobile subscriber identification number or MSIN which is unique to a particular SIM within that network and that country defined by the MNC and MCC. The MNC and MSIN together provide a national mobile subscriber identification or NMSI.

Figure 6:
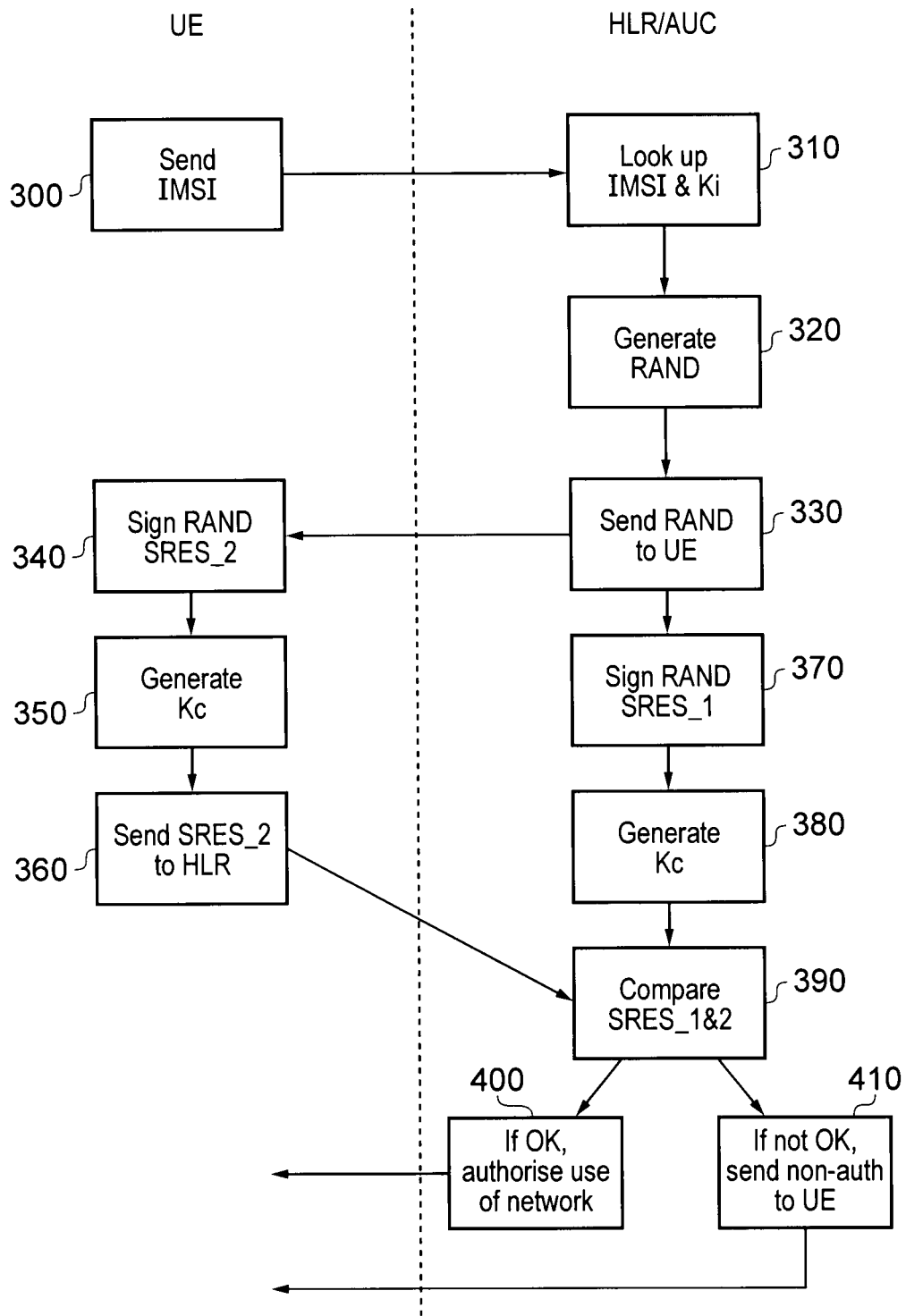
FIG. 6 is a schematic flowchart illustrating an authorisation process between a UE and the network.

FIG. 6 is a schematic flowchart illustrating an authorisation process between a UE and the network. Steps shown to the left of the vertical broken line are carried out at the UE 10 and steps shown to the right of the vertical line are carried out at the HLR/HSS 60 and/or the AUC 70.

At a step 300, the UE sends its IMSI to the network. In response to receipt of the IMSI, the HLR/HSS consults the AUC to request that the AUC generates an authorisation triplet. The AUC 70 consults its database to find the secure key Ki at a step 310. At a step 320, the AUC generates a single-use random number, RAND. At a step 330, the AUC sends the random number RAND to the UE. The UE receives the random number RAND and, at a step 340, signs the number RAND with the SIM's secure key Ki to generate a signed response SRES_2.

The SIM then generates the encryption/decryption key Kc by applying the A8 algorithm to the number RAND and the secure key Ki, at a step 350. As mentioned above, the encryption/decryption key Kc is used later (subject to a successful authorisation) for encrypting and decrypting communications via the mobile network during the present session. At a step 360, the UE sends the signed response SRES_2 back to the network.

Meanwhile, the AUC also generates a signed response SRES_1, by applying its stored version of the secure key Ki relating to that IMSI to the number RAND, at a step 370. As a step 380, the AUC generates the encryption/decryption key Kc by applying the A8 algorithm to the number RAND and the secure key Ki.

As a step 390, the AUC compares the signed responses SRES_1 and SRES_2. If the IMSI and Ki pair held by the SIM of the UE matches the IMSI and Ki pair held by the AUC, and bearing in mind that the versions of the A3 algorithm used by the SIM and the AUC are the same, then the signed responses SRES_1 and SRES_2 should be identical. If they are identical, then the SIM should be authorised for use during a current session on the network. Of course, authorisation is not provided if an IMSI has already been authorised for a currently open session on the network. But assuming that the IMSI is not already authorised for a currently open session, and the two signed responses are identical, then at step 400, the SIM holding that IMSI is authorised to use the network and the encryption/decryption key Kc is passed to the SGSN 50. A message is sent by the HLR/HSS 60 to the UE 10 to indicate that authorisation has been granted.

On the other hand, if either the IMSI is party to a currently open session that has already been authorised, or the two signed responses do not match, then the IMSI is not authorised for a connection session on the network. In this case, a non-authorisation message is passed to the UE a step 410, and the version of the encryption/decryption key Kc generated by the AUC is not passed to the network for use in encrypting or decrypting communication with that UE.

Here, it is worth discussing "activation" and "registration" in respect of an IMSI.

At activation (first time entry in the HLR/HSS), an IMSI is activated in the HLR/HSS immediately, so the activation cost of € 1-10 is due straightaway as the cost is related to licensing and resource usage. This process takes place in respect of temporary-use IMSIs and is paid for by the manufacturer or MNO, for example. For paid-use of a SIM, the user must initiate a registration process. At this stage, the user registers the IMSI to use network services and establishes a one-to-one relationship between the IMSI (known to both the SIM and the MNO), the user's payment account and possibly also an identification of the UE in which the SIM is installed.

Figure 7:
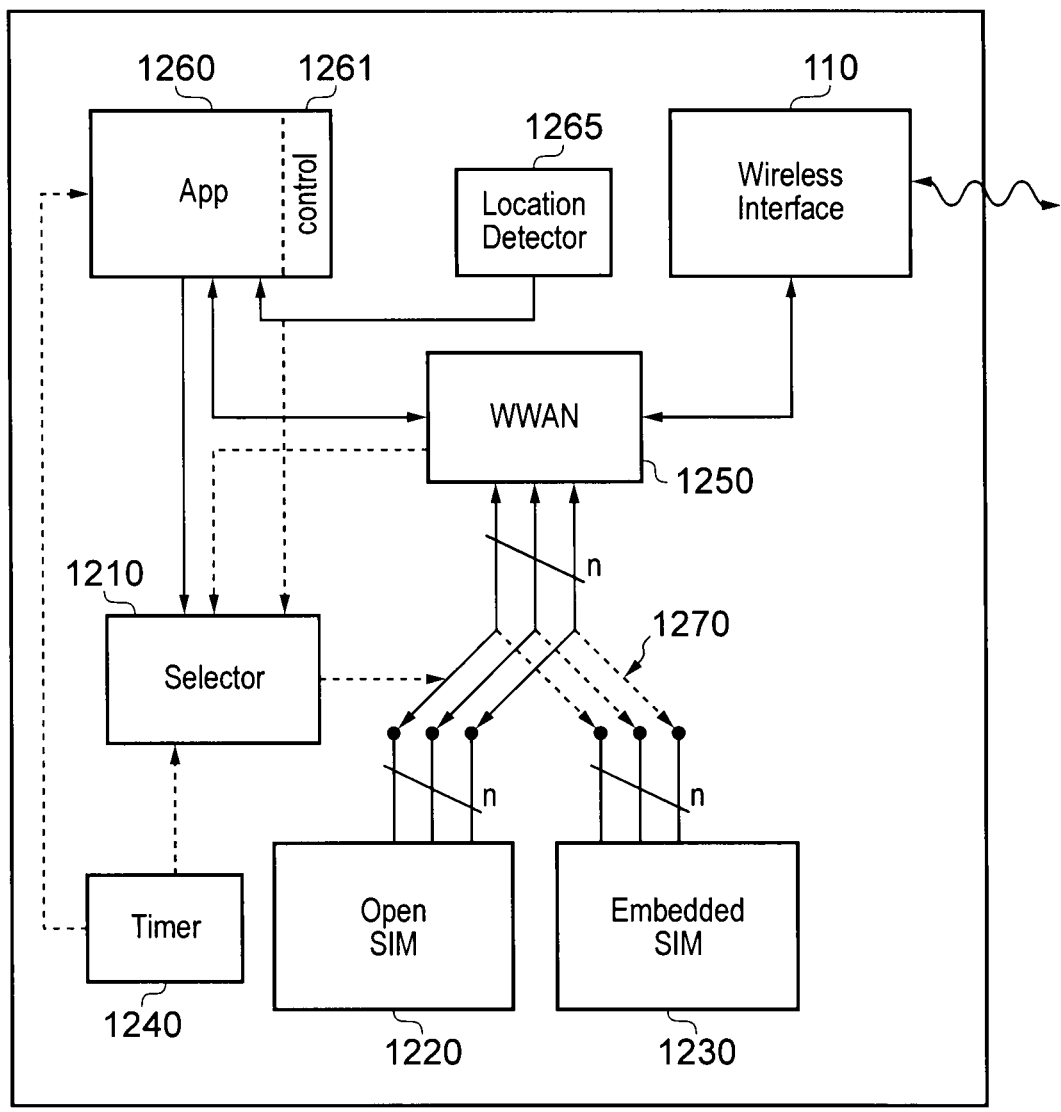
FIG. 7 schematically illustrates a UE employing multiple SIMs.

FIG. 7 schematically illustrates a UE 1200 having more than one SIM. The UE comprises a wireless interface 110 similar to that shown in FIG. 2. However, the UE comprises two (or more) SIMs 1220, 1230 and a selector 1210 to select between the two SIMs. One of these (1220) is removable or "open", to allow the user to select his own data provider if desired. The open SIM might be user-mountable within a socket accessible from the outside of the UE. The other SIM 1230 is non-removable by the user, being (optionally) hardwired into the UE. The selector 1210 is responsive to a timer 1240, to a WWAN processor 1250 and/or to a processor executing application software 1260 (configured to execute one or more programs which make use of mobile data access). The item 1260 in the Figure may be considered as schematically representing the processor executing the application software. That is to say, according to the particular arrangement in use, the selector is responsive to any one or more of these three units. (Note that in other embodiments, the selector could be implemented as part of the WWAN processor 1250 or as part of the UE's operating system. It is shown as a separate unit here primarily for clarity of the diagram).

The selector 1210 controls the operation of a switch 1270. In basic terms, each of the two SIMs has all of the connections which would normally be used between the SIM and a WWAN processor in a UE. These are shown schematically in FIG. 7 as a bundle of n connections. The switch 1270 allows either one of the bundles, corresponding to the embedded SIM 1230 or the open SIM 1220, to be connected to the WWAN processor as though the currently connected SIM was simply connected directly to the WWAN processor.

The WWAN processor 1250 and the wireless interface 110 provide a wireless interface communicating with a mobile data network, the wireless interface and the mobile data network cooperating to provide wireless data services to the one or more programs.

Optionally, a location detector 1265 is provided, to detect the physical location of the UE and pass this information to the application 1260 and/or the selector 1210. The location detector may be, for example, a global positioning system (GPS) location detector or a location detector based on triangulation of signals from mobile base stations. Alternative location detection mechanisms like WiFi hotspot location tables can be used. Note also that in many designs a GPS location detection function is already embodied within a WWAN chipset.

Figure 8:
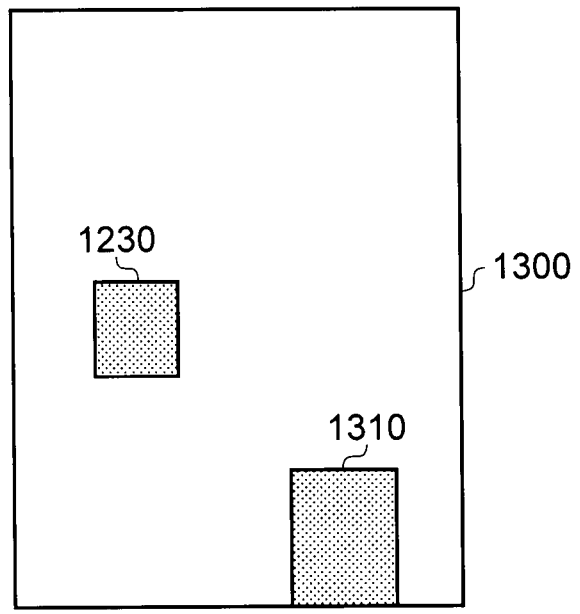
FIG. 8 is a schematic plan view of the circuit board of a UE.

Referring to FIG. 8, is a schematic plan view of the circuit board 1300 of a UE comprises the embedded SIM 1230 and a socket 1310 for the open SIM 1220. Other components mounted on either side of the circuit board 1300 are not shown for clarity of the diagram.

Figure 9:
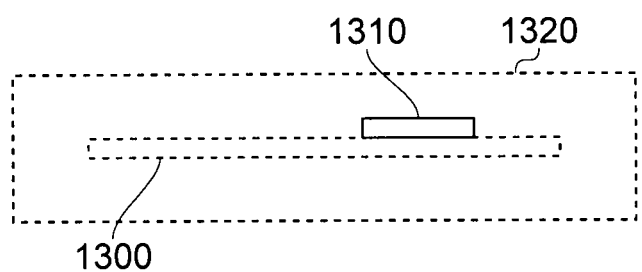
FIG. 9 is a schematic end elevation of the circuit board of FIG. 8 installed in a casing.

The socket 1310 is mounted at the edge of the circuit board 1300. The reason for this is evident from FIG. 9, which represents a schematic end elevation of the circuit board of FIG. 8 installed in a casing 1320. The end face of the casing 1320 is provided with an opening to allow access to the socket 1310. However, the opening does not allow access to the remainder of the circuit board 1300 or to any other internal components within the UE.

Figures 10, 11:
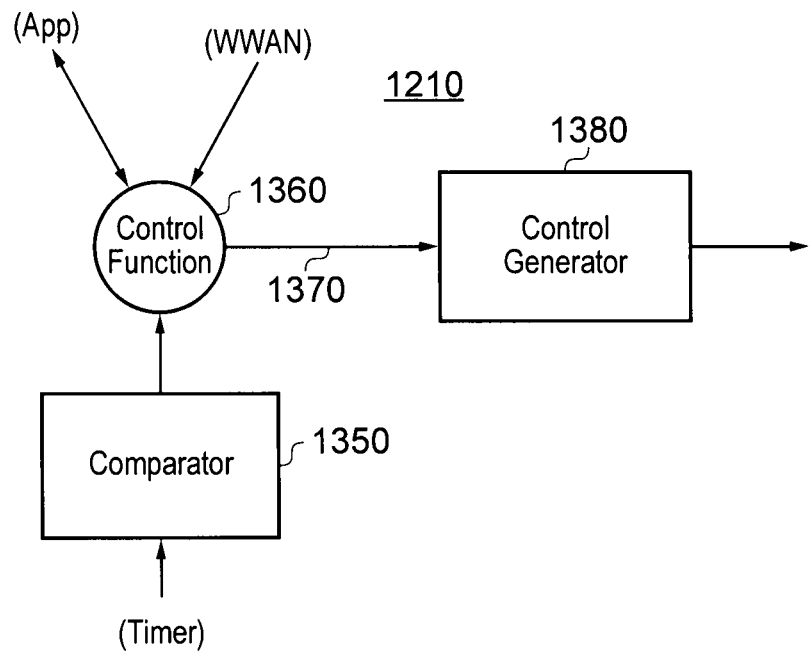
FIG. 10 schematically illustrates a SIM selector.
FIG. 11 schematically illustrates an application table.

FIG. 10 schematically illustrates the SIM selector 1210. The selector 1210 receives inputs from the timer 1240, the application software 1260 and the WWAN processor 1250. The input from the timer 1240 comprises a current time value. This current time value is compared, at a comparator 1350, with a schedule of times at which the embedded SIM should be used.

Examples of a schedule of times are as follows:
a. at regular intervals, for example once a week, the UE can connect to the Internet via the embedded SIM so as to receive marketing or promotional data or messages from suppliers of those messages such as the manufacturer or business partners of the manufacturer;
b. at regular intervals, for example once a week, the UE can connect to the Internet via the embedded SIM so as to exchange diagnostic data with the manufacturer;
c. at possibly more frequent regular intervals, for example once a day, the UE can connect to the Internet via the embedded SIM to access security services, for example to allow the remote tracking and/or blocking of stolen UE devices;
d. by applying a comparison of the current usage time rather than the current time of day, the timer 1240 and the comparator 1350 can be used to allow standard open-Internet monthly usage by the owner of the UE for a limited time period within each month, for example two hours of Internet access each month.

For simplicity, the schematic arrangement of FIG. 10 involves the comparator 1350 generating a single binary output having a "high" value if the embedded SIM should be used and a "low" value if the open SIM should be used. A similar format may be used for control signals received from the application software (see below for examples) and from the WWAN processor, in that their control signals are also high if the embedded SIM should be used and low if the open SIM should be used. However, as discussed below, a more complex form of control signal may be used instead. These control signals are combined by a control function 1360. The control function 1360 provides a single output 1370 which indicates whether the embedded SIM should be used, in dependence upon the one or more of the control inputs (from the timer/comparator, the application software or the WWAN processor) which may individually indicate that the embedded SIM should be used. The output 1370 of the control function 1360 is set to "low" if the control function indicates that the open SIM should be used. The output 1370 is passed to a control generator 1380 which provides a signal to control the switch 1270.

As mentioned above, one possible control input to the selector 1210 comes from the application software 1260. In this way, the application software 1260 can indicate to the selector 1210 whether or not the embedded SIM should be used. In order to do this, a control function 1261 associated with the application software 1260 consults and application table of the type shown in FIG. 11, which is associated with the control function 1261. The application table represents a list of application programs which can be executed by the UE, and associated with each entry in the list is an indication of whether the open SIM or the embedded SIM should be used. The control function 1261 consults the application table and causes the appropriate low or high signal to be sent by the application software to the selector 1210 depending on the type of SIM defined in the table for the currently executing application software. It will be seen that if a currently executing application program is not found in the table of FIG. 11, then a default position is that the open SIM should be used.

Many UE devices are capable of multi-tasking, which is to say that they can execute more than one application program simultaneously. So the question arises: how to deal with conflicts if one or more currently executed application programs are specified as requiring the open SIM and one or more other application programs currently being executed are specified as requiring the embedded SIM.

One way to address this matter is as follows. Each application program in the application table for which the embedded SIM is specified has a further entry indicating whether execution of that application program should be continued (in the case that the open SIM is in use for other application programs) or deferred. So, assume for example that the browser application is in use and so the open SIM is specified by the respective entry in the application table. If the diagnostic application also requires to execute at the same time, the table entry indicates that diagnostic function should not be deferred and so the diagnostic function should continue but using the Internet access provided by the open SIM. On the other hand, if the marketing application is running, it could perhaps be perceived as unfair by the UE user that he should have to pay for potentially unwanted marketing information as part of his Internet access charges using the open SIM. So, the marketing application is deferred at that time, to be executed later when the open SIM is no longer in use and the embedded SIM is available.

The WWAN processor can also initiate use of the embedded SIM rather than the open SIM. In this regard, much of the functionality associated (as part of the current schematic discussion) with the selector 1210 could in fact be incorporated into a WWAN chipset.

A possible but relatively simple set of rules, namely that any command input to the selector 1210 specifying the embedded SIM will cause the embedded SIM to be used, but that the application table handled by the control function 1261 allows use of the embedded SIM to be overruled, could be adopted. However, this might lead to potentially unwanted outcomes. For example, non-scheduled diagnostic operations may end up using the open SIM whereas they should really be directed towards Internet access via the embedded SIM, or browser operation during a scheduled diagnostic operation may end up being carried out using the embedded SIM rather than the normal open SIM associated with the operation of the browser application.

These potential difficulties can be addressed in various ways.

Firstly, the scheduled services such as scheduled diagnostics and scheduled marketing data access can be specified to take place at times when the user would not normally be operating the browser application, for example overnight, assuming the UE is active at that time or can be brought back to activity by a timed wake-up process.

Secondly, a set of rules may be applied to the operation of the timer and the scheduling function so that if an "open SIM" application is in use at the time that the timer function specifies a scheduled access using the embedded SIM, that scheduled access is deferred until the application using the open SIM has been closed.

Thirdly, in the case of urgently required diagnostic or similar access, either the access could go ahead using the open SIM without even asking the user full permission, or the user could be asked to approve the use of the open SIM for these urgently required functions.

The open SIM and the embedded SIM use different respective mobile identities (for example, IMSI and Ki values).

More generally, the logical operation of the control function 1360 can follow a set of rules in order to generate the output 1370 which is provided to the control generator 1380. In this way, in respect of a first set of data services, the selector provides SIM-related data to the WWAN processor and the wireless interface by identifying the mobile data processing apparatus to the mobile data network according to a first mobile identity (that of the embedded SIM); and in respect of other data services not part of the first set of services, the selector provides SIM-related data to the WWAN processor and the wireless interface so as to identify the mobile data processing apparatus to the mobile data network according to a separate mobile identity (that of the open SIM), different to the first mobile identity. Other control inputs, beyond or in place of some of those shown as schematic examples in FIG. 10, may be used. Examples of such rules (and, where applicable, the control inputs to the control function 1360) are given below. These example rules may be adopted individually or in various combinations:

a. The WWAN processor 1250 can detect whether an open SIM is in fact installed in the UE and communicate this by a control signal to the control function 1360; if not, the open SIM is not selected.

b. The WWAN processor can detect whether a currently open connection session exists via either SIM, and can communicate this by a control signal to the control function 1360; if a currently open session exists via the open SIM, the control function can inhibit the embedded SIM from being used until the open SIM session is finished. In other words, this can involve detecting whether the second (open SIM) mobile identity is already in use in respect of an active data connection and, if so, inhibiting connection to the mobile data network using the first (embedded SIM) mobile identity and/or inhibiting operation of the first set of data services.

c. If however a currently open session exists via the embedded SIM, then the control function 1360 can select the open SIM (so terminating the embedded SIM session) in dependence upon the type of data access required (as defined by the control input from the application control 1261). For example, if the data access relates to a user-facing application such as a browser or an email tool, then the embedded SIM session can be terminated straight away and control handed to the open SIM, in order that the user does not experience a delay in his use of the UE. On the other hand, if the access required via the open SIM relates to a system process, invisible to the user (such as a software update by an installed application), as specified by the control input from the application control 1261, then the use of the open SIM can be deferred until the current embedded SIM session is complete. A control signal can be returned to the application control 1261 to this effect.

d. The WWAN processor 1250 can indicate to the control function 1360 whether the open SIM is even registered to a network in the current location. If not, the use of the open SIM can be inhibited by the control function 1360.

e. If the UE comprises a physical location detector 1265, then location information can be provided to the control function 1360 and location-based services can be initiated via the embedded SIM. For example, the user walks by a particular restaurant which has established a sponsorship arrangement with the UE provider. The control function 1360 and/or a background application 1260 maintains a schedule providing location data defining such sponsored locations (and which can be updated by the UE provider as part of data access using the embedded SIM). When the detected current location of the UE is within a first threshold distance (for example, 100 meters) of the sponsored location, the control function initiates, or is instructed by the application control 1261 to initiate, a short duration connection via the embedded SIM in order to download any advertising or offer-related material relating to the sponsored location. The application 1260 can then indicate such material to the user by display on a display screen associated with the UE and, optionally, an audible alert or the like. In another embodiment, the download of the data is initiated in this manner when the UE's current location is first within a second, higher, threshold distance of, say, 1 kilometer of the sponsored location in order that the data is ready be provided to the user as soon as the user approaches within the first threshold distance of the sponsored location. In other words, in embodiments of the invention, a current location of the UE is detected, and if the current location is within one threshold distance (for example, 1 kilometer) of a predetermined location, data is downloaded, as a data service within the first (embedded SIM) set of data services, relating to that predetermined location; and if the current location is within another threshold distance (for example, 100 meters) of the predetermined location, smaller than the other of the threshold distances, the downloaded data is provided as an alert to a user of the mobile data processing apparatus.

f. The embedded SIM can be preferred at off-peak times, such as between 2 am and 6 am, local time for that UE. Note that other time-related rules are discussed separately above.

g. Groups of these rules can be combined, for example: if the open SIM is available, and already connected in respect of a current session, and the current time is such that use of the embedded SIM is disallowed or use of the open SIM is allowed according to a rule, then continue to use the open SIM; otherwise, a request to use the embedded SIM should be allowed.

h. The policies or rules implemented by the control function 1360 can be arranged so as to block a request connection via the embedded SIM according to the rules' outcome.

In general, any one or more of the rules discussed in the present description may be used, either individually or in combination, so that the control function 1360, and therefore the selector 1210, can execute a process to decide whether to connect via the embedded SIM or the open SIM according to received control signals and/or internally established rules relating to one or more of:

a. function rules such as those set out above;
b. the type of data service required
c. the destination address of the required data transfer
d. business rules;
e. timing rules (for example, according to a current time at which that data service is initiated) and/or
f. UE current location.

FIGS. 12-17 schematically illustrate aspects of the operation of the selector 1210 of FIG. 10. These aspects relate to certain examples of the rules which can be followed by the control function 1360 (and therefore by the selector 1210) and may not apply to other examples of the application of such rules.

Figure 12:
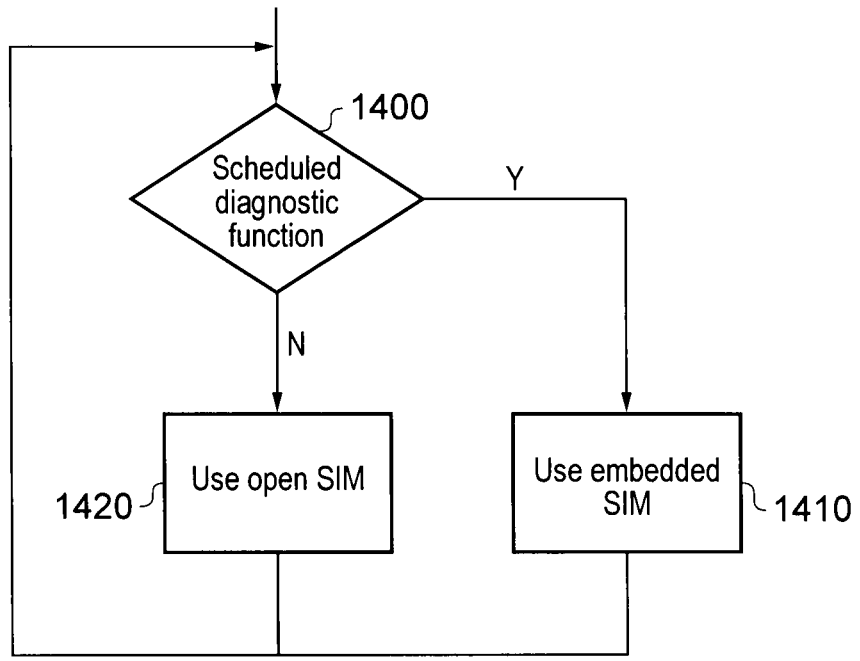
FIGS. 12-17 schematically illustrate aspects of the operation of the selector of FIG. 10.

Referring to FIG. 12, at a step 1400, a test is carried out to detect whether a scheduled diagnostic function should take place. Referring back to FIG. 10, this test is carried out by the comparator 1350 comparing the current time with a scheduled time, and the control function 1360 processing the output of the comparator 1350. If the answer to the step 1400 is "yes" then at a step 1410, the embedded SIM is used. If however the answer is "no" then at a step 1420, the open SIM is used.

The operations of FIGS. 13-16 follow a similar pattern.

Figure 13:
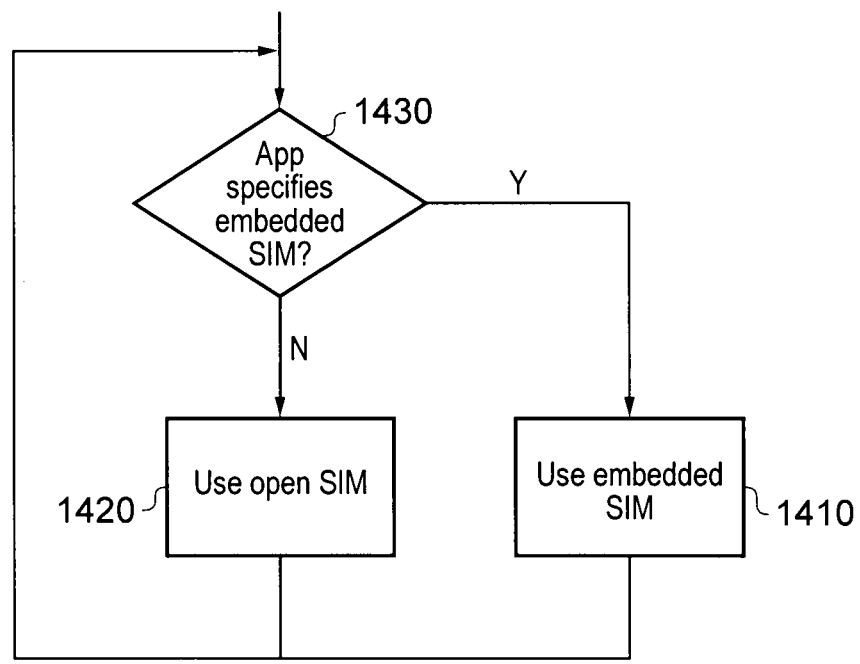

In FIG. 13, if, at a step 1430, an application specifies (via the application table of FIG. 11) the use of the embedded SIM, then control passes to the step 1410 as described above. Otherwise, control passes to the step 1420.

Figure 14:
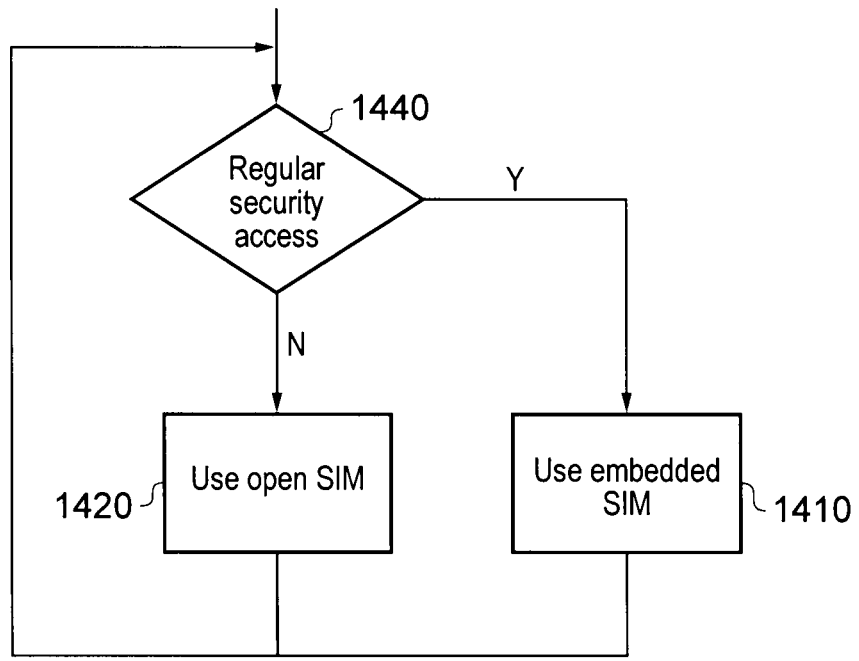

In FIG. 14, if the schedule data indicates that a regular security access should take place, such as a once-a-day check that the UE is not registered as stolen or lost, then a step 1440 passes control to the step 1410. Note that this type of access, using an embedded SIM rather than an open SIM, can provide improved security for the UE. This is because a dishonest user of the UE (for example a thief or someone who has found the UE but not returned it) cannot prevent this type of regular security access by the simple step of removing the open SIM. Because the regular security access takes place using the embedded SIM, which is not accessible to or removable by the user of the UE, it makes no difference to the security access if the open SIM is removed and replaced.

Figure 15:
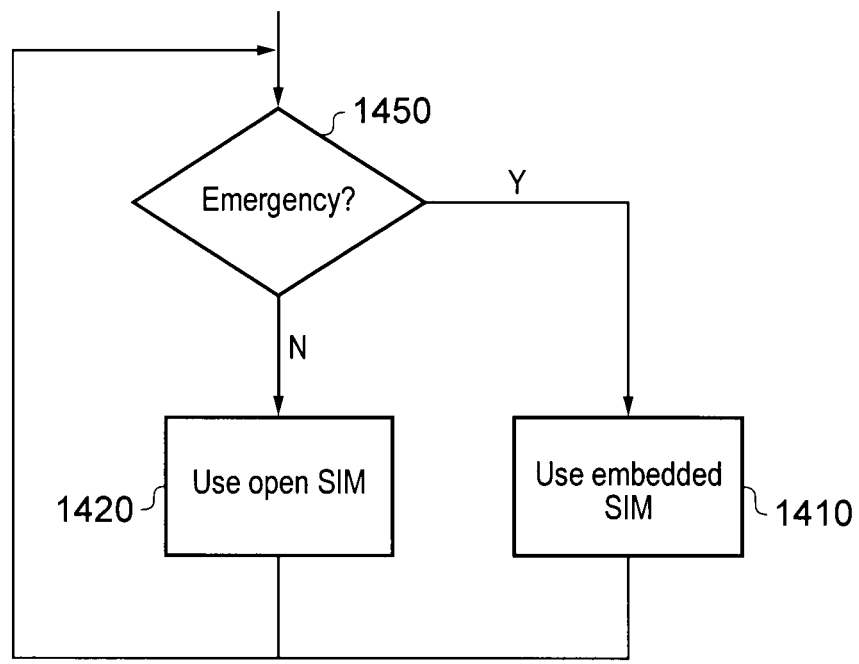

In FIG. 15, if the user indicates to the UE, via the application software and its associated user interface, that the user needs to make an emergency contact, the embedded SIM can be selected by the outcome of a step 1450. To avoid misuse of the embedded SIM in this way, the nature of the emergency contact can be closely defined, for example to a limited set of destination addresses and/or phone numbers.

Figure 16:
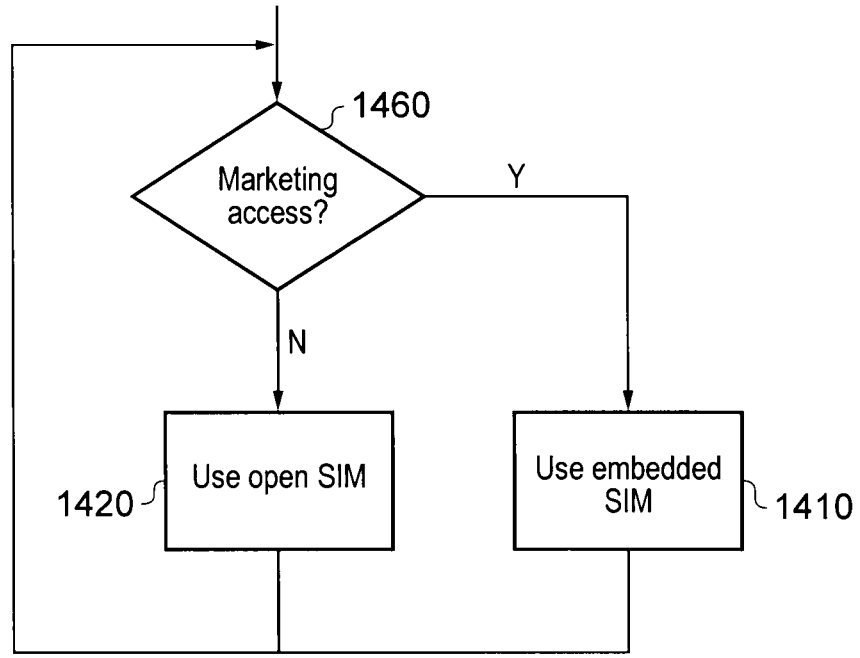

In FIG. 16, a step 1460 tests whether a marketing data access is required. This may be a scheduled access to receive marketing information from a provider, as discussed above, or could take place whenever the remainder of the system is idle.

Figure 17:
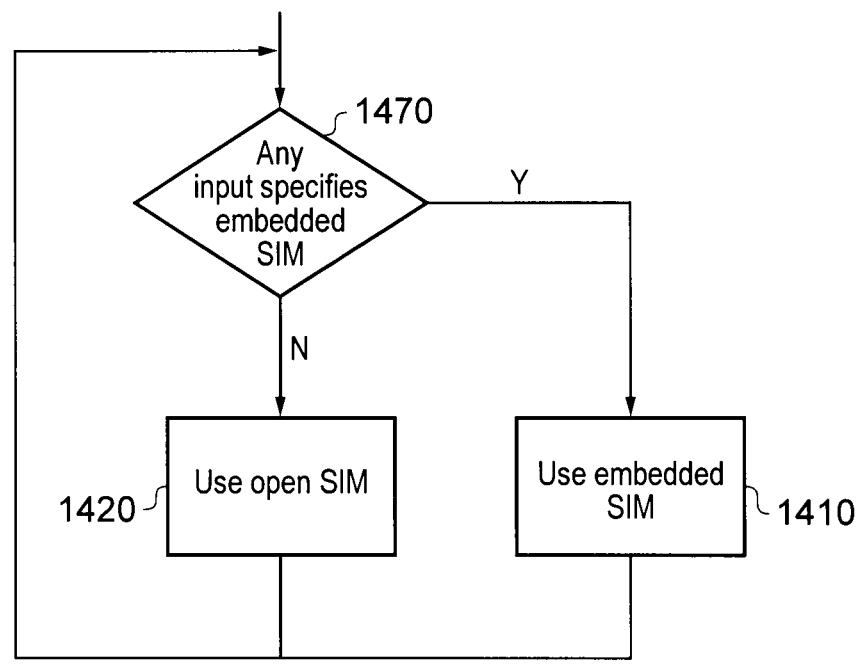

FIG. 17 represents a part of the operation of the control function 1360 using a very simple schematic example of a combined rule, in that at a step 1470, if any input data specifies that the embedded SIM should be used, it is selected at the step 1410. It will be appreciated from the discussion above that embodiments of the invention make use of more complex rules.

The arrangement described above allows various modes of operation. Some of the possibilities will now be described.

In general terms, embodiments of the invention envisage that the open SIM is used for so-called "normal" operations for the user of the UE. The user would be expected to provide a SIM for the network operator of his choice, and to pay in the conventional way for Internet access via the open SIM. Note that the provision of the socket 1310 for the open SIM allows the UE to comply with competition law in various countries which specifies that the end user must be free to choose his own network operator for use with the UE.

The embedded SIM can be used to provide a value-added channel for the user, for example by providing a gateway to the provision of extra services which can be sponsored (that is, paid for) by a provider such as the equipment manufacturer, a software vendor or an advertiser. In this way, the extra services (those associated with the embedded SIM) can be provided free to the end user. Examples of such services include one or more of the following:

1. the provision of conventional open-Internet usage, for example for a limited time or data amount per period such as per month;
2. the provision of selective unlimited usage of certain services and/or applications. For example the user could be provided with unlimited free access to an Internet store's shopfront, to the user's account on a subscription-based music provider, to a social networking website funded by advertising and the like;
3. access to services such as remote diagnostics, remote tracking and/or blocking of stolen or lost devices and the like;
4. the provision of a marketing channel for the manufacturer, a network operator or various business partners to promote sales and services by pushing marketing messages to the UE.

From the user's point of view, the system can operate as follows.

If the user has no SIM in the socket 1310, the user is still able to access the free services such as those mentioned above.

If, on the other hand, the user has populated the socket 1310 with his own network operator's SIM, the user can access the Internet using the conditions applicable to the user's account with that network operator. Normally, network access would be via the open SIM. However, as described above, the system can force the use of the embedded SIM for certain applications and/or at certain times.

Also as described above, the operating system and/or application software of the UE can establish scheduled accesses via the embedded SIM.

Although the system is described above handle the switching between the two SIMs at an application level, it would be possible to implement these functions directly in the UE's operating system (OS) layer, in a so-called "kernel" mode, as this would render the functionality less dependent upon particular application programs. In particular, the control functionality 1261 could be part of the OS rather than part of an application.

As described above with reference to FIG. 7, at a hardware perspective, the multiple SIMs are connected to the same inputs and outputs of the WWAN processor, but via the switch 1270 so that only one SIM is connected to the WWAN processor at any one time. The control of the switch 1270 can be carried out by one or more of the application software (or the OS layer as mentioned above), a time control, or the WWAN processor itself.

It will of course be appreciated that the arrangements are not limited to two SIMs, one open and one embedded, but could be used with a higher number of SIMs. For example, a system could use multiple embedded SIMs for different respective "free" purposes. In one possible arrangement, a first embedded SIM could be used for downloading electronic publications according to an account held with an electronic book and periodical publisher, whereas another embedded SIM could be used for handling diagnostic and related data to do with the operation of the UE itself. Another possibility is that multiple embedded SIMs are provided to allow the system to select (without the input of all knowledge of the user) amongst the embedded SIMs, depending on the country of use of the UE. Similarly, or as an alternative, more than one open SIM could be provided, or at least the sockets for more than one open SIM to be inserted may be in place. This would allow the user to run more than one chargeable account in respect of the UE, for example if the user lived close to the border between two countries, the user could operate one account in one country and another account, with a different open SIM, in the other country.

It will of course be appreciated that the expression "SIM" or "SIM card" does not define any particular shape, design or form factor of the identification module referred to in this way. In particular, the "embedded SIM" can be mounted directly to the circuit board 1300 rather than being mounted to a card which is in turn mounted to the circuit board. At the time of filing the present application, there have been at least three different form factors of SIM card in use for removable cards. It is envisaged that other form factors may be proposed, but the actual choice of form factor is of no technical relevance to the present application, other than the mere fact that the SIM used for the open SIM should be insertable and removable with respect to a UE.

The discussion above has related generally to physical SIM "cards" being insertable by the user to provide the function of the open SIM. This is a useful model for the user to adopt; the user can see clearly which SIM is in use as the open SIM by inspecting the physical card which has been inserted into the UE, and the user can easily understand the operation of changing from one open SIM to another. Hardware SIMs of this type rely on physical security provided by a secure hardware arrangement to store and handle secret keys and the like in a tamper-proof manner. However, it is possible to implement either or both of the open SIM and the embedded SIM as software processes, which in embodiments of the invention are implemented by a secure data processing device, to provide a "software SIM".

With a software SIM, a processor within the secure data processing device (forming part of the UE) has a secure memory and stack, and routes software calls for SIM functionality internally using the secure memory and stack, so as to avoid problems of tampering with the secure data.

Using such a software SIM as the open SIM, it could be considered that the functionality or the mobile identity of the open SIM is "insertable and removable" with respect to the UE, but this does not require the physical insertion of a piece of plastic. In other words, the software SIM can provide that IMSI-Ki pairs are downloadable so that a user never needs to fumble with physical SIM cards but instead simply downloads a new data pair in order to change MNO and/or contract details. It has been suggested that MNOs may be keen to avoid software-based SIM arrangements, because they would in fact make it easier for users to switch providers and could remove some of the control that the MNOs currently maintain over subscribers and subscriber data.

A software SIM could be used as the embedded SIM(s) and/or the open SIM(s). Accordingly, an option is for the embedded SIM to be a physical hardware unit which is soldered or welded in place within the UE so as to be inaccessible by the user. Another option is for the embedded SIM to be a software SIM with a fixed IMSI-Ki pair, unchangeable by the user. Another option is for the open SIM to be a physical hardware SIM card which is physically insertable and removable to and from a SIM socket in the UE. Another option is for the open SIM function to be provided by a software SIM process.

A further option is for the functionality of the embedded SIM and the open SIM to be provided by a software process which uses either the embedded SIM's IMSI-Ki pair (which is not changeable by the user, but could in principle be changed by the UE manufacturer or provider, without the user's knowledge or approval, to change the MNO accessed by the embedded SIM function) or the open SIM's IMSI-Ki pair to access a mobile network, depending on the nature of the data access which is currently required (as described in connection with the SIM selector function above). In this last option, the functionality of the two or more SIMs is separate, even if they share (on a time-division basis) some common software operations.

From the business point of view, the embedded SIM and the associated switching may add slightly to the cost of the UE, but this needs to be balanced against the benefits available in terms of a permanent marketing channel, diagnostic information, opportunity for sponsorship and the like.

A further possibility is that the embedded SIM is used for regular internet access at the discretion of the user. That is to say, the user can choose to use an account associated with the embedded SIM rather than an account associated with the open SIM.

Figure 18:
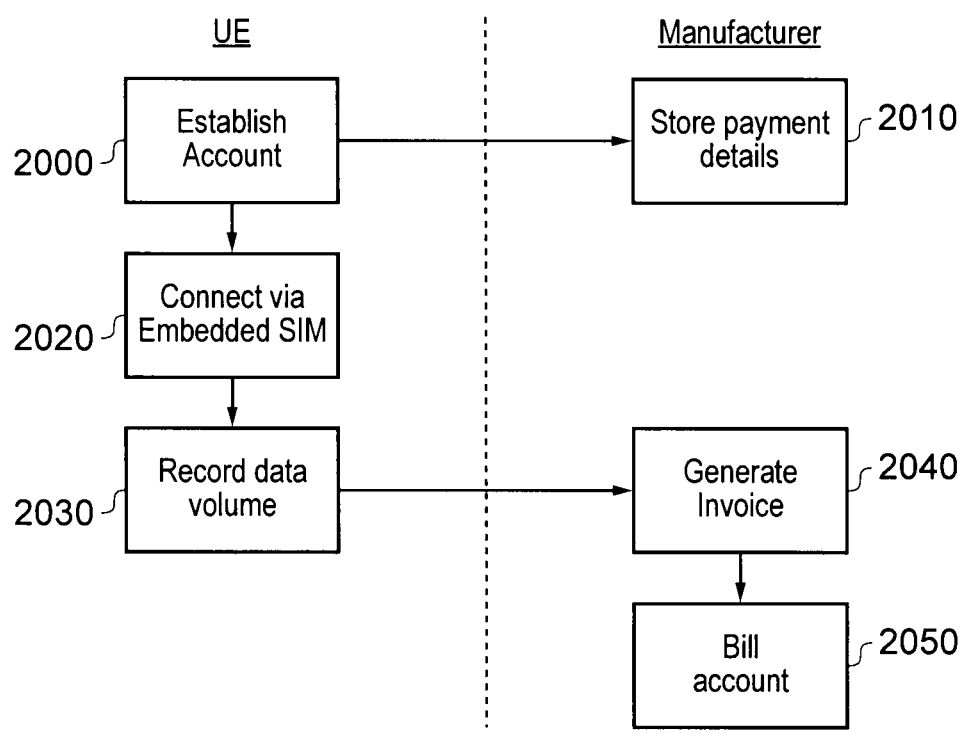
FIG. 18 is a schematic flowchart illustrating a billing process for a UE.

FIG. 18 is a schematic flowchart illustrating a billing process for a UE using such an arrangement.

In the situations described above, the types of use allowed for the embedded SIM are limited by category, address, application, time, data quantity or the like.

However, if a separate billing arrangement is established, which is to say, a billing arrangement independent of the mobile data network's billing system, then ongoing full use of the embedded SIM can be allowed by the UE manufacturer.

Referring to FIG. 18, as a step 2000, the user establishes an account with the UE manufacturer for payment of data charges related to the purchased UE. The manufacturer stores payment and related details as a step 2010. At a time when the user wishes to carry out mobile data access using the UE, the UE connects to a mobile data network at a step 2020 using the embedded SIM's IMSI-Ki pair. The UE can transfer data to or from the Internet over this data connection. At a step 2030, the UE (for example the application software 140/1260) acts as a data transfer detector and records the data transfer duration and/or data volume transferred via this route. The UE transmits details of the data transfer duration and/or data volume to the manufacturer which, at a step 2040, generates an invoice relating to the transfer data and charges the user's account at a step 2050.

Note that the process of FIG. 18 can be followed without necessarily charging the user for all of the user's data access. For example, in one arrangement the user might not be charged for a first predetermined amount of data access in a charging period, for example, the first 500 megabytes of data access in a calendar month could be free to the user, with subsequent data access within the calendar month being charged to the user. This "free" data access could be provided as an incentive for the user to buy the UE in the first instance, and so effectively bundled into the original purchase price, and/or could be provided in consideration of the user accepting advertising material downloaded via the embedded SIM. In other embodiments, as discussed above, any data access to particular internet domains may be provided "free" to the user (that is, deducted from the chargeable totals handled by the steps 2030 and 2040 in FIG. 18) in consideration of a subsidy or sponsorship to they UE provider from that domain provider. Examples of such domains include:

a. a social media domain (so that access to that social media domain is free to the end user)

b. an anti-virus or internet security provider's domain (so that a single subscription to the security provider's product can include all data access relating to ongoing updates to that product)

c. more generally, a software application's or hardware component's update, diagnostics or usage detection domain While the description above has referred to SIMs, IMSIs and Ki keys, these terms are sometimes considered to relate to particular network standards or protocols. It will be appreciated that any type of identification module and mobile identity data fulfilling the basic requirements of identifying a node on a data network may be used in embodiments of the invention.

Although parts of the description have related to the use of physically separate SIMs, it will be appreciated, as described above, that a reconfigurable SIM may be used instead of a set of two or more separate SIMs. Or a reconfigurable SIM may be used in place of any one of the SIMs discussed above. Such a reconfigurable SIM can store one or more IMSI-Ki pairs in a rewritable memory so as to be updated by a secure over-the-air (OTA) update or other secure transaction with a data provider. An example of such an arrangement is described in United Kingdom patent application number 1111355.2 filed on 4 Jul. 2011, the contents of which are hereby incorporated in their entirety.

As discussed above, the data to identify the mobile data processing apparatus (UE) according to the first mobile identity can be provided from a non-removable identification module in the mobile data processing apparatus, and/or the data to identify the mobile data processing apparatus according to the second mobile identity can be provided from a user-removable identification module connectable to the mobile data processing apparatus. Alternatively, a software-implemented identification module can be configured to supply data to the wireless interface so as selectively to identify the mobile data processing apparatus to the mobile data network according to the first and/or the second mobile identity The identification modules may be SIMs (Subscriber Identification Modules). A mobile identity may comprise a subscriber identifier and a secret encryption key. The first set of data services (as provided via the embedded SIM's mobile identity) may comprise a service by which marketing data is transferred between the mobile data processing apparatus and a remote marketing server, and/or a service by which diagnostic data is transferred between the mobile data processing apparatus and a remote server.

The techniques described above may be implemented in hardware, software, programmable hardware such as application specific integrated circuits or field programmable gate arrays, or combinations of these. It will be understood that where the techniques are implemented, at least in part, by software or the like, then such software and providing media (such as non-transitory storage media) by which such software is provided are considered as embodiments of the invention.

Although the techniques have been described in respect of devices using data services, the UE could comprise one or more audio transducers and an audio data encoder and decoder; and at least some of the data transferred over the mobile data network could comprise encoded audio data handled by the audio data encoder and decoder. The embedded SIM arrangement could be suitable for services such as emergency distress beacons which (a) require to communicate very infrequently, and (b) do not necessarily need knowledge of their mobile telephony number (MSISDN).

It will be appreciated that although examples have been described with respect to particular mobile telecommunications standards, the invention is not limited to a particular standard, and is applicable to various arrangements in which an identification module carries a mobile identity. Examples of identification modules in other formats include the Universal Integrated Circuit Card (UICC) in UMTS, while the Removable User Identity Module (R-UIM) is used in some CDMA (code division multiple access) systems.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of operating a mobile data processing apparatus, comprising:

executing one or more programs which make use of mobile data access;

communicating, via a wireless interface, with a mobile data network, the wireless interface and the mobile data network cooperating to provide wireless data services to the one or more programs, the wireless interface identifying the mobile data processing apparatus to the mobile data network according to a first mobile identity or a second mobile identity different from the first mobile identity, the wireless interface identifying the mobile data processing apparatus by only one of the first and second mobile identities at any one time;

automatically selecting a mobile identity, without receiving an input from a user, according to a predetermined set of rules associating data services with mobile identities, wherein the selecting step further comprises the steps of:
providing with respect to a first set of data services, data to the wireless interface by identifying the mobile data processing apparatus to the mobile data network according to the first mobile identity, and
providing with respect to other data services not part of the first set of services, data to the wireless interface so as to identify the mobile data processing apparatus to the mobile data network according to the second mobile identity,
wherein the predetermined rules include at least a rule relating to whether a current location of the mobile data processing apparatus is within a threshold distance of a predetermined location, the method further including
selecting whether a data service is part of the first set of data services according to a current location of the mobile data processing apparatus;
detecting a current location of the mobile data processing apparatus;
downloading data, when the current location is within a first threshold distance of the predetermined location, as a data service within the first set of data services, relating to that predetermined location; and
providing the downloaded data as an alert to a user of the mobile data processing apparatus, when the current location is within a second threshold distance of the predetermined location, smaller than the first threshold distance.

2. The method according to claim 1, comprising:
providing the first set of data services free to the user of the mobile data processing apparatus.

3. The method according to claim 2, wherein the first set of data services comprises a service by which marketing data is transferred between the mobile data processing apparatus and a remote marketing server.

4. The method according to claim 2, wherein the first set of data services comprises a service by which diagnostic data is transferred between the mobile data processing apparatus and a remote server.

5. The method according to claim 1, comprising:
selecting whether a data service is part of the first set of data services according to a current time at which that data service is initiated.

6. The method according to claim 1, comprising:
detecting whether the second mobile identity is already in use with respect to an active data connection, and inhibiting another connection to the mobile data network using the first mobile identity based on a result of the detecting indicating that the second mobile identity is already in use.

7. The method according to claim 6, comprising:
inhibiting, when the second mobile identity is already in use with respect to an active data connection, operation of the first set of data services.

8. The method according to claim 1, comprising:
providing the data to identify the mobile data processing apparatus according to the first mobile identity from a non-removable identification module in the mobile data processing apparatus.

9. The method according to claim 8, wherein the identification module is a SIM (Subscriber Identification Module).

10. The method according to claim 1, comprising:
providing the data to identify the mobile data processing apparatus according to the second mobile identity from a user-removable identification module identification module connectable to the mobile data processing apparatus.

11. The method according to claim 10, wherein the identification module is a SIM (Subscriber Identification Module).

12. The method according to claim 1, comprising a software-implemented identification module configured to supply data to the wireless interface so as selectively to identify the mobile data processing apparatus to the mobile data network according to the first and/or the second mobile identity.

13. The method according to claim 1, wherein the mobile identity comprises a subscriber identifier and a secret encryption key.

14. The method according to claim 1, wherein the predetermined rules further include at least a rule relating to a type of data service required, a rule relating to a destination address of a required data transfer, and a rule relating to a current time at which a data service is initiated.

15. A mobile data processing apparatus comprising:
a processor configured to execute one or more application programs which make use of mobile data access;
a wireless interface configured to communicate with a mobile data network;
one or more identification modules configured to provide data to the wireless interface so as to identify the mobile data processing apparatus to the mobile data network according to a first mobile identity or according to a second, separate mobile identity different to the first mobile identity; and
a selector configured to automatically select either the first mobile identity or the second mobile identity, without receiving an input from a user, in respect of a current data communication via the mobile data network, in which the selector is responsive to a set of predetermined rules associating data services with mobile identities and is configured to select the first mobile identity in respect of a current data communication relating to a first predetermined set of data services, and to select the second mobile identity in respect of other data services, the selector being configured to select only one mobile identity at any one time,
wherein the predetermined rules include at least a rule relating to whether a current location of the mobile data processing apparatus is within a threshold distance of a predetermined location,
and mobile data processing apparatus further comprising a location detector that detects a current location of the mobile data processing apparatus, mobile data processing apparatus being further configured to
select whether a data service is part of the first set of data services according to a current location of the mobile data processing apparatus;
download data, when the current location is within a first threshold distance of the predetermined location, as a data service within the first set of data services, relating to that predetermined location; and
provide the downloaded data as an alert to a user of the mobile data processing apparatus, when the current location is within a second threshold distance of the predetermined location, smaller than the first threshold distance.

16. The apparatus according to claim 15, wherein a data service is selected to be part of the first set of data services according to a current time at which that data service is initiated.

17. The apparatus according to claim 15, wherein the selector is configured to detect whether the second mobile identity is already in use with respect to an active data connection, and inhibit another connection to the mobile data network using the first mobile identity based on a result of the detection indicating that the second mobile identity is already in use.

18. The apparatus according to claim 17, wherein, when the second mobile identity is already in use in respect of an active data connection, the selector is configured to inhibit operation of the first set of data services.

19. The apparatus according to claim 15, further comprising:
a non-removable identification module in the mobile data processing apparatus configured to provide the data to identify the mobile data processing apparatus according to the first mobile identity.

20. The apparatus according to claim 19, wherein the identification module is a SIM (Subscriber Identification Module).

21. The apparatus according to claim 15, further comprising a user-removable identification module connectable to the mobile data processing apparatus configured to provide the data to identify the mobile data processing apparatus according to the second mobile identity.

22. The apparatus according to claim 21, wherein the identification module is a SIM (Subscriber Identification Module).

23. The apparatus according to claim 15, further comprising a software-implemented identification module configured to supply data to the wireless interface so as selectively to identify the mobile data processing apparatus to the mobile data network based on at least one of the first and the second mobile identity.

24. The apparatus according to claim 15, wherein a mobile identity comprises a subscriber identifier and a secret encryption key.

25. The apparatus according to claim 15, wherein the first set of data services comprises a service by which marketing data is transferred between the mobile data processing apparatus and a remote marketing server.

26. The apparatus according to claim 15, wherein the first set of data services comprises a service by which diagnostic data is transferred between the mobile data processing apparatus and a remote server.

27. The apparatus according to claim 15, wherein the first mobile identity corresponds to an embedded subscriber identification module (SIM) which is non-removable from the apparatus, the second mobile identity corresponds to an open SIM that is user-removable from the apparatus, the embedded SIM is provided for the first set of data services, which are services sponsored by a provider entity, and the open SIM is provided for the second set of data services, which are services for use over a network which the user is subscribed to, the provider entity being one of a manufacturer of the apparatus, a software vendor, and an advertiser.

28. The apparatus according to claim 27,
wherein a data service is selected to be part of the first set of data services sponsored by the manufacturer according to the current location of the mobile data processing apparatus, and the predetermined location has a predetermined arrangement with the provider entity.

29. A non-transitory computer readable medium having stored thereon a program that when executed by a computer causes the computer to execute a method comprising:
executing one or more programs which make use of mobile data access;
communicating, via a wireless interface, with a mobile data network, the wireless interface and the mobile data network cooperating to provide wireless data services to the one or more programs, the wireless interface identifying the mobile data processing apparatus to the mobile data network according to a first mobile identity or a second mobile identity different from the first mobile identity, the wireless interface identifying the mobile data processing apparatus by only one of the first and second mobile identities at any one time;
automatically selecting a mobile identity, without receiving an input from a user, according to a predetermined set of rules associating data services with mobile identities, wherein the selecting step further comprises the steps of:
providing with respect to a first set of data services, data to the wireless interface by identifying the mobile data processing apparatus to the mobile data network according to the first mobile identity, and
providing with respect to other data services not part of the first set of services, data to the wireless interface so as to identify the mobile data processing apparatus to the mobile data network according to the second mobile identity,
wherein the predetermined rules include at least a rule relating to whether a current location of the mobile data processing apparatus is within a threshold distance of a predetermined location, the method further including
selecting whether a data service is part of the first set of data services according to a current location of the mobile data processing apparatus;
detecting a current location of the mobile data processing apparatus;
downloading data, when the current location is within a first threshold distance of the predetermined location, as a data service within the first set of data services, relating to that predetermined location; and
providing the downloaded data as an alert to a user of the mobile data processing apparatus, when the current location is within a second threshold distance of the predetermined location, smaller than the first threshold distance.

* * * * *